C. F. MACDONALD.

VEHICLE HEADLIGHT.

APPLICATION FILED DEC. 11, 1916.

Reissued Mar. 26, 1918. 14,453.

Clayton F. MacDonald INVENTOR

BY G. Howard ATTORNEY

UNITED STATES PATENT OFFICE.

CLAYTON F. MACDONALD, OF CLEVELAND, OHIO.

VEHICLE-HEADLIGHT.

14,453. Specification of Reissued Letters Patent. Reissued Mar. 26, 1918.

Original No. 1,198,466, dated September 19, 1916, Serial No. 73,345, filed January 21, 1916. Application for reissue filed December 11, 1916. Serial No. 136,363.

*To all whom it may concern:*

Be it known that I. CLAYTON F. MACDONALD, a citizen of the United States, residing at Cleveland, county of Cuyahoga, and State of Ohio, have invented certain new and useful Improvements in Vehicle-Headlights, of which the following is a specification.

My invention relates to vehicle headlights, and comprises an improved means for tilting the reflector in the headlight, whereby the beam of light may be directed either straight ahead or downwardly or upwardly to meet varying needs. This improved means is operable and controllable preferably by electrical instrumentalities, including an electric switch located at the steering wheel or seat of the driver of the vehicle, and the device is also capable of being manipulated by a finger-gripping device arranged at the side of each lamp or headlight.

Figure 1:
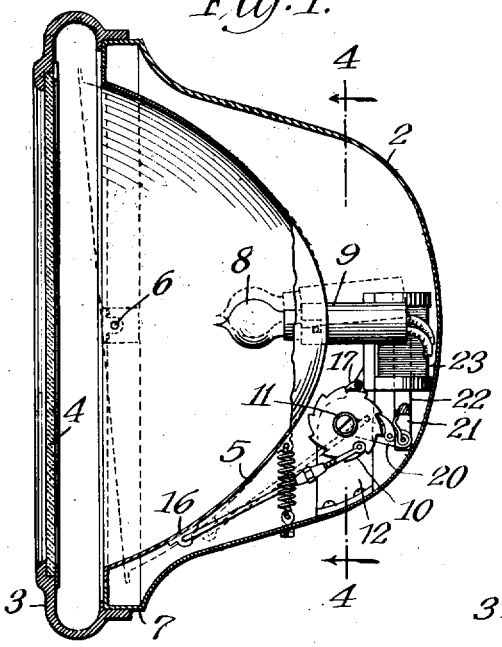
Figure 2:
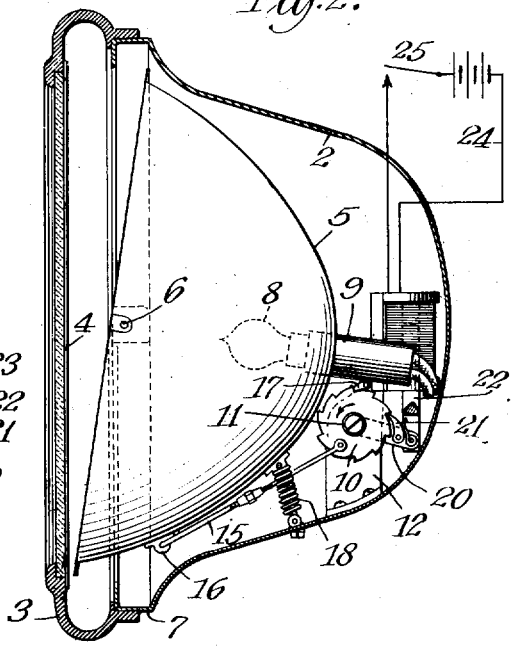
Figure 3:
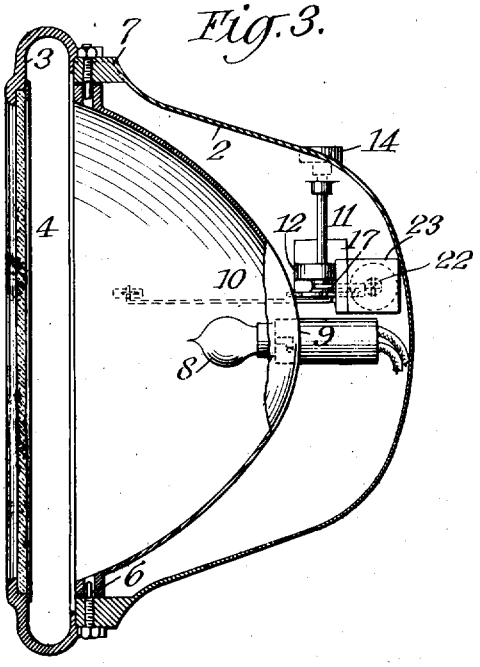
Figure 4:
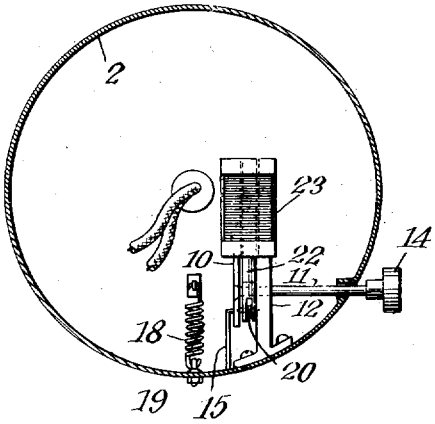

In the accompanying drawings, Figure 1 is a sectional view of a headlight embodying my improvement, and Fig. 2 is a similar view showing the reflector tilted to direct the beam of light upwardly. Fig. 3 is a plan view and section on substantially the horizontal center of Fig. 1, and Fig. 4 is a cross section and rear elevation on line 4—4, Fig. 1.

The head-light or lamp comprises a shell or casing 2 having a cover or door 3 at its front adapted to be removed or opened and carrying the usual lens or plate of glass 4.

A parabolic reflector 5 is pivotally supported within casing 2 by pivot pins or screws 6, located preferably opposite one another on the horizontal diagonal line of the casing and removably mounted in the annular flange 7 at the front end of said casing so that the reflector and interior working parts may be conveniently assembled and disassembled. The reflector carries the usual electric light 8 in a socket 9 at its center and rear, and the space in the casing behind the reflector is utilized to house my improved mechanism for tilting the reflector. This mechanism consists of a ratchet wheel 10 mounted on a rotatable shaft 11 having bearing in a standard 12 affixed to the bottom at one side of the vertical center of casing 2, and the said shaft extends through one side of the casing, see Fig. 4, and has a head or finger gripping member 14 at its end whereby the ratchet-wheel may be turned and set in any predetermined position. A short crank rod 15 is pivotally connected at its opposite ends to ratchet wheel 10 and a lug or ear 16 at the bottom of reflector 5, whereby any rotative movement of the ratchet wheel will cause a corresponding tilting of the reflector. A stop pawl 17 pivotally mounted upon standard 12 engages the top of ratchet wheel 10, and a coiled spring 18 connected with the reflector and an adjusting and fastening screw 19 at the bottom of casing 2 provides a constant pull on crank rod 15 to hold the ratchet teeth of wheel 10 in stop engagement with pawl 17, and the spring also takes up all looseness of the parts and prevents noise and rattle. There is also a time when the spring rotates the ratchet wheel a full one-half of a revolution without stop or intermission and that is when the crank rod 15 is carried across the dead center of said wheel on an upward movement thereof, thereby tilting the reflector instantly from one extreme position (downwardly inclined) to another extreme position (upwardly inclined), as delineated in dotted lines, Fig. 1, and full lines Fig. 2. On the other hand when the reflector is tilted upwardly as shown in Fig. 2, a step-by-step rotation of ratchet wheel 10 will tilt the reflector step by step, the number and degree of the inclined positions assumed by the reflector being dependent upon the number of ratchet teeth and radial movements of wheel 10 as it rotates intermittently throughout one-half of a revolution carrying the crank rod to the right from the starting position shown in Fig. 2. Working the present ratchet wheel in this way, an advance of one tooth will lower the beam of light slightly but it will still be projected upwardly. The advance of a second tooth will place the reflector in a central position as shown in full lines, Fig. 1, and project the beam of light straight ahead. The next tooth advanced will tilt the reflector to direct the light downwardly, and a further movement of one tooth of wheel 10 will augment this downward tilting and place the reflector and its crank rod in the position shown in dotted lines, Fig. 1. This latter position places the crank rod slightly below the dead center of thrust; therefore, further rotation of wheel 10 will carry the crank pin across the dead center and the pull of spring 18 is then exercised to rotate wheel 10 approximately one-half of a revolution to place the reflector in the inclined position shown in Fig. 2.

The instrumentalities for imparting an intermittent movement to ratchet wheel 10 comprise an arm 20 mounted to oscillate upon shaft 11 at one side of said wheel and provided with a spring-pressed dog 21 to engage the ratchet teeth, the free end of said arm having loose pivotal engagement or linked connection with the lower end of the movable core 22 of an electric magnet 23 mounted upon standard 12. The coil of this magnet is connected in a battery circuit 24 having a suitable switch 25 to close the same, and when the coil is energized the core is lifted and the ratchet wheel rotated the distance of one tooth. In this way the operator of the vehicle may change the position of the reflector instantly to throw the beam of light variously as required, as upward in hill climbing and reading elevated signs, or straight ahead for throwing the beam of light the maximum distance ahead on a level with the road, or downward in different degree for dimming purposes, that is to remove the glaring effects of the horizontal beam of light. Two headlights are used generally, and these may be operated independently or jointly, dependent upon the manner in which the electrical connections are made as must be obvious to those skilled in the electrical art. For example, each magnet coil may be electrically connected in a separate circuit or in series in the same battery circuit. The handle member 14 also permits independent operation and setting, a matter of convenience when the driver happens to be on the ground at the front of the machine, and of advantage when the electrical circuit is out of working order.

What I claim, is:

1. A head-light casing, a reflector mounted to tilt within said casing, crank and ratchet mechanism and a spring to tilt said reflector, and electrical instrumentalities to operate said mechanism intermittently.

2. A head-light casing and a tilting reflector therein, and ratchet mechanism having an operating shaft extending through said casing and a crank connection with said reflector.

3. In a head-light, a tilting reflector, ratchet mechanism having an operating shaft for manual control and a crank connection with said reflector, and auxiliary electrical operating means for said ratchet mechanism having a controlling switch.

4. In a head-light, a tilting reflector, a ratchet wheel, a rod connected in crank relations with said wheel and engaged with said reflector to tilt the same, a stop pawl and a spring to co-act with said wheel in tilting and setting said reflector, and means to operate said ratchet wheel and crank connections.

5. In a head-light, a tilting reflector, a ratchet wheel and crank connections and a spring to tilt said reflector, and an electrical power device and associate mechanism to rotate said ratchet wheel intermittently, in combination with an electrical circuit and means to energize said electrical device.

6. In a head-light, a tilting reflector, a spring, a crank and ratchet wheel having operating connections with said reflector, and an electrical magnet having a movable core and a ratchet wheel engaging member to rotate said wheel intermittently.

7. A head-light having a main reflector on horizontal pivots, mechanism to tilt and set said reflector in variable fixed positions to project the full beam of light upwardly or downwardly or horizontally, and electrical actuating means to operate said mechanism.

8. A head-light having a main reflector, crank mechanism to tilt said reflector in a step by step movement and electrical means to actuate said mechanism.

9. A head-light having a main reflector adapted to tilt on fixed side pivots and a lamp fixed to tilt therewith, a ratchet mechanism to tilt said reflector to variable set positions and electrical means to operate said mechanism.

10. A head-light having a main reflector supported on opposite pivots, crank and ratchet wheel mechanism and a connecting rod between said parts and said reflector to tilt the reflector, and electrical means to operate said mechanism having a controlling switch.

11. A head-light casing and a tilting main reflector mounted therein on side pivots at its front, crank and ratchet mechanism and a spring adapted to tilt said reflector on said pivots, in combination with electrical means to operate said mechanism.

12. A headlight comprising a casing, a shiftable reflector mounted within the casing and shiftable to project the full beam of light downwardly on to the road without cutting off any part thereof and thereby prevent the glare of the light, a rotary wheel operatively connected with said reflector for shifting the reflector in different directions in a vertical plane, and means for rotating said wheel thereby to shift the reflector.

13. A head-light comprising a casing, a shiftable reflector mounted within the casing and shiftable to project the full beam of light downwardly on to the road without cutting off any part thereof and thereby prevent the glare of the light, a rotary wheel operatively connected with said reflector for shifting the reflector in different directions in a vertical plane, and electrically operative means connected with said wheel for rotating it and thereby the reflector.

14. A head-light comprising a casing, a shiftable reflector within the casing and mounted to project the full beam of light upwardly or downwardly or horizontally, electrical actuating mechanism for shifting said reflector, and means for shifting the reflector independently of said electrical actuating means.

15. A head-light comprising a casing, a shiftable reflector within the casing and mounted to project the full beam of light upwardly or downwardly or horizontally, mechanism for operating said reflector, electrical actuating means for operating said mechanism, and means for shifting the reflector independently of said operating mechanism.

16. A head-light comprising a casing, a reflector mounted within the casing for shiftable movement to project the full beam of light upwardly or downwardly or horizontally, manually operative means for shifting the reflector and electrically operative means for also shifting it.

17. A head-light comprising a casing, a shiftable reflector within the casing, manually operative means for shifting the reflector, and electrically operative means for also shifting it.

18. A headlight comprising a casing, a shiftable reflector mounted within the casing and shiftable to project the full beam of light downwardly on to the road without cutting off any part thereof and thereby prevent the glare of the light, a rotary member located within the casing and operatively connected with said reflector for shifting it in different directions in a vertical plane, and electrical actuating means operatively connected with said rotary member for rotating it and thereby the reflector.

19. A headlight comprising a casing, a shiftable reflector mounted within the casing and shiftable to project the full beam of light downwardly on to the road without cutting off any part thereof and thereby prevent the glare of the light, a bulb within and movable with said reflector, and means carried by the casing for tilting said reflector step by step into different positions in a vertical plane.

20. A headlight comprising a casing, a shiftable reflector mounted within the casing and shiftable to project the full beam of light downwardly on to the road without cutting off any part thereof and thereby prevent the glare of the light, a bulb within and movable with said reflector, and means carried by the casing for tilting said reflector step by step into different positions in a vertical plane, said means being effective to retain said reflector in any one of its shifted positions.

21. A headlight comprising a casing, a shiftable reflector mounted within the casing and shiftable to project the full beam of light downwardly on to the road without cutting off any part thereof and thereby prevent the glare of the light, a rotary member located within the casing and operatively connected with the reflector for shifting said reflector in different directions in a vertical plane, and means for rotating said rotary member continuously in the same direction thereby to shift said reflector into its different positions.

22. A head light comprising a casing, a reflector swingingly supported within the casing and shiftable to project the full beam of light downwardly on to the road without cutting off any part thereof thereby to prevent the glare of the light, a light medium carried within the reflector, means for tilting the reflector and including a pair of movable members one having a dead center position relatively to the other at one time, and means for carrying said last member past its dead center position during the tilting of the reflector thereby to shift the reflector instantly from one position to another.

23. A head light comprising a casing, a reflector swingingly supported within the casing and shiftable to project the full beam of the light downwardly on to the road without cutting off any part thereof thereby to prevent the glare of the light, a light medium carried within the reflector, means for tilting the reflector and including a pair of members, one a rotatable member and the other having a dead center position relatively to said rotatable member at one time, and a spring for carrying said last member past its dead center position during the tilting of the reflector thereby to shift the reflector instantly from one position to another.

24. A head light comprising a casing, a reflector swingingly supported within the casing and shiftable to project the full beam of the light downwardly on to the road without cutting off any part thereof thereby to prevent the glare of the light, a light medium carried within the reflector, electrically operative means for tilting the reflector and including a rotatable member operatively connected with the reflector for shifting said reflector step by step, and means for rotating said rotatable member independently of its step by step operating means when the reflector has been partly shifted thereby to shift the reflector instantly from one position to another.

Signed at Cleveland, county of Cuyahoga and State of Ohio, this 8th day of December 1916.

CLAYTON F. MACDONALD.